Patented June 23, 1953

2,643,269

UNITED STATES PATENT OFFICE 2,643,269

HALOGEN-PROMOTED OXIDATION

Frederick B. Augustine, Jefferson, N. J., assignor to Socony-Vacuum Oil Company, Incorporated, a corporation of New York No Drawing. Application July 18, 1950, Serial No. 174,593

16 Claims. (Cl. 260—590)

The present invention relates to the catalytic conversion of methyl and methylene groups to carbonyl groups by gas containing free oxygen in the presence of finely divided catalyst comprising at least one oxide of tellurium and, more particularly, to the aforesaid catalytic conversion when carried out in the presence of a halogen having a molecular weight greater than 38. It is to be understood that the phrase "gas containing free oxygen" includes elemental oxygen, pure diatomic oxygen, diatomic oxygen diluted with an inert gas such as nitrogen, helium, carbon dioxide, and triatomic oxygen or ozone and air. Furthermore, it is manifest that a halogen having a molecular weight greater than 38 includes chlorine, bromine and iodine but excludes fluorine.

In the co-pending application for United States Letters Patent Serial No. 139,529, filed January 19, 1950, in the name of Frederick P. Richter, the conversion of methyl or methylene groups of an organic compound in which the hydrogen atoms of the aforesaid groups are activated by the proximity of a double bond, i. e., alpha to an unsaturated carbon atom; or a hydroxyl group or a carbonyl, to a carbonyl group with a gas containing free oxygen in the presence of finely divided catalyst comprising predominantly at least one oxide of tellurium is described.

Broadly illustrative of the classes of compounds which may be oxidized in this manner and the products obtained are the following equations:

(1)
$$Z-CH_2R \xrightarrow[Te]{O} Z-\overset{O}{\underset{\|}{C}}-R$$

where Z is a monovalent radical having at least one center of unsaturation such as C=O; a group capable of oxidation to a carbonyl group for example a hydroxyl group; C≡C; C=C; or the double bond of an aryl group directly adjacent to the methyl or methylene group and R is hydrogen or alkyl or cycloalkyl or aryl or alicyclic or heterocyclic; when R is other than hydrogen it can be substituted by any substituent which will survive under the reaction conditions, for example, a phenyl group, a halogen, a nitro group and the like.

(1) (a)
$$HC\equiv C-CH_2R \xrightarrow[Te]{O} HC\equiv C-\overset{O}{\underset{\|}{C}}R + H_2O$$

(b)
$$H_2C=CH-CH_2R \xrightarrow[Te]{O} H_2C=CH-\overset{O}{\underset{\|}{C}}-R + H_2O$$

(c)
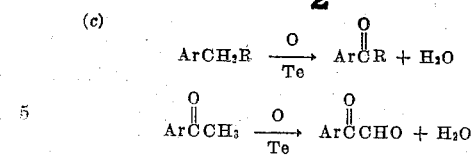

where Ar is an aryl radical substituted or unsubstituted.

(2) (a)
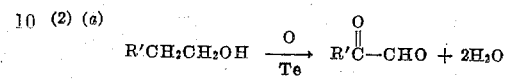

(b)
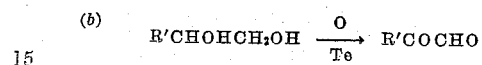

where R' is hydrogen, alkyl, cycloalkyl, aryl, heterocyclic and where other than hydrogen may be substituted by any substituent which will survive under the reaction conditions, for example, a phenyl group, a halogen, a nitro group and the like.

It will be recognized that in the foregoing Z equals HC≡C; H_2C=CH—; Ar—; ArC=O—; R'CH_2—; R'CHOH—; and R'OH—.

(3) Compounds containing a center of unsaturation directly adjacent a methyl or methylene group such as the double bond of an aryl group as an integral part of an alicyclic ring system:

(a)
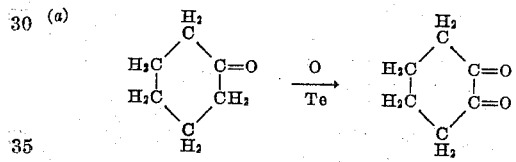

(b)
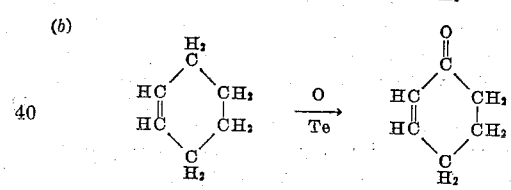

(c)
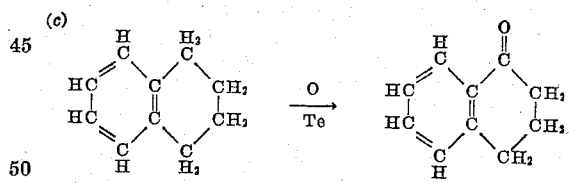

It is to be noted that $$\xrightarrow[Te]{O}$$

has been used in the foregoing equations to indicate a reaction taking place in the presence of a gas containing free oxygen as defined hereinbefore and a finely divided catalyst comprising predominantly at least one oxide of tellurium.

Tellurium both of the "C. P." and "Technical" grades has been used in preparation of the catalyst for the oxidation of organic substances of the class described hereinbefore. The "C. P." grade tellurium had the following analysis:

Tellurium content _____ 99 to 99.8%
Selenium content_____ None
Other impurities such as lead, copper bismuth_____ Slight traces The "Technical" grade tellurium was reported to have a tellurium content of about 95%.

The manner in which the finely divided catalyst comprising at least one oxide of tellurium is used apparently is unimportant. For example, it can be used as a finely divided, unsupported catalyst, as a finely divided catalyst on an inert support or on an "active" support, or as "massive" tellurium which has been activated. It is to be noted that an "active" support is one which in the absence of catalyst comprising predominantly at least one oxide of tellurium but in the presence of a gas containing free oxygen accelerates the oxidation of organic substances of the class described hereinbefore usually to produce oxidation products other than those of the carbonyl type illustrated hereinbefore. An organic carbonyl group is a group which exists in that state of oxidation which is intermediate between a primary or secondary alcohol and a carboxylic acid. An inert support is one which in the absence of catalyst comprising predominantly at least one oxide of tellurium but in the presence of a gas containing free oxygen does not accelerate to any appreciable extent the oxidation of organic substances of the class described hereinbefore to produce oxidation products.

A catalyst giving satisfactory conversion of organic substances of the class defined hereinbefore was prepared as follows:

Twenty parts by weight of tellurium dioxide were dissolved in about 200 parts by weight of aqueous hydrochloric acid (about 28 per cent HCl) and the mixture heated to effect solution. The solution was then concentrated to about one-third the original volume and poured over 310 parts by weight of inert alumina of 8-14 mesh size. The alumina was inert "fused" alumina previously treated with hot aqueous nitric acid and washed with distilled water. The mixture of alumina particles and the solution of tellurium dioxide in hydrochloric acid was agitated to ensure a homogeneous coating on the alumina particles. The yellow, wet mass of coated alumina particles was then treated with sulfur dioxide gas. Thereupon, the particles rapidly turned black indicative of the deposition of finely divided tellurium. The black particles were then treated in a furnace at temperatures of about 150° C. to about 350° C. with nitrogen gas to remove water, hydrogen chloride and any oxides of sulfur which might be present. The catalyst, finely divided tellurium on an inert support, was then ready for use as a catalyst in the oxidation of organic substances of the class defined hereinbefore to organic substances containing at least one additional carbonyl group.

The present invention provides an improvement over the method described in the aforesaid co-pending application Serial No. 139,529 wherein by the conversion to the carbonyl compound is increased as much as 1000 per cent.

It is an object of the present invention to provide an improved method for converting an organic compound having at least one activated methyl or methylene group to an organic compound having a carbonyl group with a gas containing free oxygen in the presence of finely divided catalyst comprising predominantly at least one oxide of tellurium.

It is another object of the present invention to provide an improved method for converting an organic compound having at least one activated methyl or methylene group to an organic compound having a carbonyl group with gas containing free oxygen in the presence of finely divided catalyst comprising predominantly at least one oxide of tellurium and in the presence of free halogen having a molecular weight greater than 38.

It is a further object of the present invention to provide an improved method for converting an organic compound having at least one activated methyl or methylene group to an organic compound having a carbonyl group at elevated temperatures with gas containing free oxygen in the presence of finely divided catalyst comprising predominantly at least one oxide of tellurium and in the presence of a material capable of decomposing to form free halogen at the temperature of the reaction, said halogen having a molecular weight greater than 38.

Other objects and advantages will become apparent from the following description.

Broadly stated the present method of converting at least one activated methyl or methylene group of an organic compound as defined hereinbefore to a carbonyl group with a gas containing free oxygen as defined hereinbefore in the presence of finely divided catalyst comprising predominantly at least one oxide of tellurium and in the presence of free halogen having a molecular weight greater than 38 comprises preparing a finely divided tellurium catalyst and passing the organic compound having at least one activated methyl or methylene group mixed with gas containing free oxygen and a free halogen over the aforesaid catalyst. The reaction is carried out at elevated temperatures of about 500° to about 1022° F., i. e., about 260° to about 550° C. Consequently, the free atomic or molecular halogen can be replaced by the addition, to the reaction gas stream or to the catalyst mass, of a compound capable of releasing free halogen at the reaction temperature. Thus, for example, sulfuryl chloride and/or iodine monobromide can be added to the gas stream or bromophthalimide and/or calcium hypochlorite can be mixed with the catalyst.

Typical of the present improved method for converting activated methyl or methylene groups to carbonyl groups with gases containing free oxygen (as defined hereinbefore) in the presence of finely divided catalyst (as defined hereinbefore) and in the presence of a halogen (as defined hereinbefore) are the following illustrative but not limiting examples.

*Example I*

Air at the rate of 150 cubic centimeters per minute, propylene at the rate of 50 cubic centimeters per minute and chlorine at the rate of about 1 to about 2 cubic centimeters per minute were charged at atmospheric pressure to 50 cubic centimeters of catalyst maintained at about 701°

F. (about 372° C.). The catalyst comprised tabular alumina impregnated with tellurium oxide (5 grams calculated as $TeO_2$) admixed with 10 mole per cent of copper and 0.2 mole per cent of manganese.

The propylene was converted to acrolein at the rate of 2.5 mole per cent per pass.

Acrolein was recovered by scrubbing the vent gases with water. Acrolein was identified by preparation of the 2,4-dinitrophenylhydrazone in a conventional manner. The melting point of this derivative was 161–162° C. (uncor.) after recrystallization.

For purposes of comparison 150 cubic centimeters of air per minute, and 50 cubic centimeters of propylene were charged to the same reactor containing 50 cubic centimeters of the same catalyst maintained at a temperature of 697° F. (369.5° C.). In the absence of added halogen the conversion of propylene to acrolein was about 0.23 mole per cent per pass. Thus, the presence of about 0.6 to about 1.4 volume per cent of a halogen raised the conversion of propylene to acrolein from 0.23 mole per cent per pass to 2.5 mole per cent per pass or an increase of 987 per cent.

A suitable source of olefins such as propylene is petroleum refinery gases, for example, a propylene-propane fraction having the following composition:

| | Mole per cent |
|---|---|
| Propylene | 52.0 |
| Propane | 45.6 |
| Ethylene | 1.0 |
| Ethane | 1.0 |
| Butenes | 0.2 |
| n-Butane | 0.1 |
| Iso-pentane | 0.1 |

*Example II*

A catalyst was prepared by pelleting a mixture of four parts by weight of an acid-treated bentonite with one part of powdered tellurium. The catalyst was activated by passing oxygen thereover as described hereinbefore. Thereafter, air at the rate of 150 cubic centimeters per minute, propylene at the rate of 50 cubic centimeters per minute and bromine at the rate of 0.54 cubic centimeters of vapor per minute were charged to the catalyst maintained at a temperature of about 703° F. (372.8° C.). (The volume of bromine vapor was calculated at the temperature and pressure at which the air and propylene were measured.)

The acrolein was recovered by scrubbing the vent gases with water and the acrolein identified by conversion to the 2,4-dinitrophenylhydrazone. The derivative when recrystallized had a melting point of 163° C. (uncor.).

For the purpose of comparison air at the rate of 150 cubic centimeters per minute and propylene at the rate of 50 cubic centimeters per minute were charged to the same catalyst maintained at 706° F. (374.4° C.). In the absence of added free halogen the conversion of propylene to acrolein was 2.55 mole per cent whereas in the presence of 0.036 volume per cent bromine the conversion was 9.0 mole per cent. Thus, the presence of as little as 0.036 volume per cent bromine increased the conversion of propylene to acrolein about 253 per cent.

*Example III*

Toluene at the rate of 0.18 grams, about 0.00196 mole or 44 cubic centimeters per minute, air at the rate of 300 cubic centimeters per minute and chlorine at the rate of about 1 to about 2 cubic centimeters per minute were charged to a reactor containing the activated catalyst of Example II. After a two-hour run at about 751 to about 767° F. (399.4° C. to 408.3° C.), the conversion of toluene to benzaldehyde was found to be 0.265 mole per cent per pass. The benzaldehyde was identified by preparing the 2,4-dinitrophenylhydrazone which after recrystallization had a melting point of 238° C. (uncor.).

For comparison, toluene at the rate of 0.17 gram per minute and air at the rate of 300 cubic centimeters per minute were charged to the activated catalyst used in Example III. After a two-hour run at about 753° to about 760° F. (400.6°–404° C.), the converssion of toluene to benzaldehyde was 0.086 mole per cent per pass.

The benzaldehyde was recovered in both instances by condensing the reactor exit vapors, distilling off the unreacted toluene and determining quantitatively the amount of benzaldehyde in the residue.

These comparative runs establish that, while in the absence of added halogen the conversion of toluene to benzaldehyde is 0.086 mole per cent per pass, in the presence of added halogen the conversion is 0.265 mole per cent. This represents an increase of about 200 per cent.

While it is preferred to have the halogen present to the extent of about 1 to about 9 mole per cent, satisfactory results can be obtained when using about 0.5 to about 20 mole per cent based upon the organic compound having an activated methyl or methylene group.

The catalyst is finely divided and comprises predominantly at least one oxide of tellurium and can be supported or unsupported. The catalyst can be obtained by mechanical subdivision of the metal, by reduction of the dioxide, by hydrolysis of an orthotellurate ester or by any other suitable means known to the art.

While the catalyst can be finely divided metallic tellurium, or activated massive tellurium or a tellurium oxide at the outset of the reaction, there is evidence to indicate that the actual catalyst is a labile system of metallic tellurium and at least one oxide of tellurium. Thus, for example, a suitable material is finely divided metallic tellurium obtained by mechanical subdivision of the metal. Another suitable form of the catalyst is metallic tellurium obtained by reduction of the dioxide, by hydrolysis of an orthotellurate ester and other suitable means known to the art. However, the finely divided metallic tellurium is preferably activated by alternate oxidation and reduction with a final oxidation or activation by treatment with a mixture of hydrocarbon and gas containing free oxygen. A simple but satisfactory application of this latter method is passage of the organic material having a methyl or methylene group directly adjacent to a center of unsaturation admixed with a gas containing free oxygen through finely divided metallic tellurium. After an induction period the catalytic reaction is initiated. Thus, while the catalyst initially is predominantly in the form of the metal, it is manifest that the catalytic material comprises predominantly at least one oxide of tellurium.

The supports can be of the inert type or the "active" type. Inert supports are those such as "fused" alumina which per se do not accelerate oxidation reactions. "Active" supports are those which, like silica gel, per se accelerate the oxidation of olefins to CO, $CO_2$ and $H_2O$. It will be understood that when a "tellurium" catalyst supported on an "active" support is used, there is a tendency for a greater proportion of the reactant or reactants to be converted to the products of ultimate oxidation. Other materials which may be used for supporting the finely divided tellurium are carbon, porous porcelain and the like.

Another form of catalyst which has been found to catalyze the reaction described hereinbefore is modified "massive" tellurium. "Massive" tellurium has been used to designate the tellurium metal sticks industrially available. While tellurium in this form is not an effective catalyst, the "massive" tellurium becomes an effective catalyst upon surface treatment to provide a relatively large surface area as compared with the volume. Such treatment merely involves alternate oxidation and reduction of the surface of the metal with, e. g., oxygen and hydrogen respectively.

In a manner similar to that described hereinbefore many compounds conforming to the general formulae, (1) $Z-CH_2R$ and (2) $RCHOHCH_2OH$ i. e., compounds having at least one methyl or methylene group directly adjacent to a center of unsaturation or directly adjacent to a hydroxyl group can be oxidized to the corresponding compounds in which the methyl or methylene group is present as aldehydic or ketonic group by gas containing free oxygen in the presence of finely divided catalyst comprising predominantly at least one oxide of tellurium.

Reaction temperatures between the normal boiling point and the temperature of decomposition of the organic substance to be oxidized can be used. For many reactions temperatures of about 200° to about 550° C. have been found useful but optimum temperatures will be dependent upon the individual conditions encountered. Thus, for example, the preferred temperature for the conversion of propylene to acrolein is about 350° to about 425° C. while the preferred temperature for the conversion of isobutylene to methacrolein is about 220° to about 380° C. Similarly, the preferred temperature range for the conversion of toluene to benzaldehyde is about 350° to about 360° C.

While the conversions described hereinbefore were all carried out at atmospheric pressure, any reasonable pressure including sub-atmospheric pressures can be used.

The organic substance to oxidizing gas ratio can be varied over a wide range although it is preferred to use ratios of about 1:1 to about 1:9.

Broadly defined, the substances which can be oxidized with air or other gas containing free oxygen in the presence of non-stoichiometric quantities of finely divided catalyst comprising predominantly at least one oxide of tellurium are those having hydrogen atoms attached to a carbon atom alpha to an unsaturated carbon atom such as in olefins of three or more carbon atoms; isolated diolefins; i. e., diolefins in which there is at least one methylene or substituted methylene group between the olefinic carbons; acetylenic hydrocarbons having at least three carbon atoms; conjugated diolefins of more than four carbon atoms; cycloolefins, for example, cyclopentadiene; aromatic hydrocarbons, such as xylene, methyl naphthalenes, methyl anthracenes and the like or alpha to a hydroxyl group, such as ethanol, propanol, pentanol, isopentanol, octanol, octadecanol, octadecenol, ethandiol, propandiol, butylene glycol, pentylene glycol, octandiol and in general hydrocarbons, substituted hydrocarbons and primary and secondary alcohols of up to 22 carbon atoms. For example, paraffin wax (18–24 carbon atoms) can be halogenated, dehydrohalogenated to the olefinic form and then oxidized.

Thus, for example, substituted butadiene derivatives conforming to the general formula

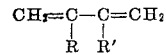

wherein R and R' are alkyl or aryl groups substituted or unsubstituted can be oxidized in the manner described hereinbefore and converted to the corresponding carbonyl compounds.

Thus, for example, 1,3-butadiene, 1,3-pentadiene (alphamethylbutadiene), 1,4-pentadiene, 2-methyl-1,3-butadiene (isoprene), 1,5-hexadiene (diallyl), 2-methyl-1,4-pentadiene (isodiallyl), 2,3-dimethyl-1,3-butadiene (diisopropenyl), 3-methyl-1,3-hexadiene, 3-methyl-2,4-hexadiene, 2,7-heptadiene, 4-methyl-1,6-heptadiene, 2,5-dimethyl-2,4,-hexadiene, 3-methyl-1,5-octadiene, 1,4-nonadiene,3,7-decadiene can be oxidized with air in the presence of finely divided catalyst comprising predominantly at least one oxide of tellurium at temperatures of about 350° to about 550° C. or generally at temperatures at which the diolefin is gaseous but below the cracking temperature of the diolefin to the corresponding carbonyl compounds.

Illustrative of another group of hydrocarbons which can be oxidized to the corresponding carbonyl compounds in gaseous phase with pure or diluted gaseous oxygen in the presence of the "tellurium" catalyst at temperatures at which the hydrocarbon is gaseous but below the cracking temperature of the hydrocarbon are the following members of the acetylene series; 2-butyne, 2-pentyne, 2-hexyne, 3-hexyne, 4-methyl-2-pentyne, 3-heptyne, 5-methyl-2-hexyne, 4,4-dimethyl-2-pentyne, 5-methyl-5-ethyl-3-heptyne, 2-undecyne, 6-dodecyne, 2-hexadecyne, 9-octadecyne.

Illustrative of the aromatic hydrocarbons which can be oxidized to the corresponding carbonyl compounds by air in the presence of the "tellurium" catalyst at temperatures between the normal boiling point of the hydrocarbon and the cracking temperature thereof are trimethylbenzene, o-ethyl-toluene (1-methyl-2-ethylbenzene), 1-methyl-2-propyl-benzene, 1,3-dimethyl-4-ethylbenzene, tetramethylbenzene, 1-methyl-4-isobutylbenzene, 1,2-dimethyl-4-propylbenzene, 1,2,-4-trimethyl-5-ethylbenzene, 1-methyl-3-amylbenzene, 1,3-dimethyl-4,6-diethylbenzene, 1-methyl-2-propyl-4-isopropylbenzene, 1,3,5-trimethyl-2,4-diethylbenzene, alpha and beta styrene, 1-phenyl-1,3-butadiene, 1-methyl-4-propenylbenzene, 1-phenyl-2-pentene, dimethyl naphthalene, dimethylanthracene, dimethylphenanthrene and the like.

Illustrative of the cyclo-olefins which can be oxidized to the corresponding carbonyl compounds by air in the presence of the "tellurium" catalyst at temperatures between the boiling point and the cracking temperature of the cycloolefin are 1-methyl-1-cyclobutene, 1-methyl-1-cyclopentene, 1,2-dimethyl-1-cyclopentene, 1-methyl-2-ethyl-1-cyclopentene, 1-methyl-2-propyl-1-cyclopentene, 1,2-dimethyl-1-cyclohexene, and 1-ethyl-3-methyl-1-cyclohexene.

Illustrative of the organic compounds, having a methyl or methylene group activated by the presence of a hydroxyl group, which can be oxidized to the corresponding carbonyl compounds by gaseous oxygen (pure or diluted), ozone and air in the presence of the "tellurium" catalyst at temperatures between the boiling point of the compound and the temperature at which said compound cracks or decomposes are the following: glycol, propandiol-1,2; propandiol-1,3; 1,2-dihydroxybutane, 1,4-dihydroxybutane, 2,3-dihydroxyhexane and the like. Mono-hydroxy compounds such as the aliphatic alcohols, ethanol, butanol, propanol, hexanol, octanol and the like can also be oxidized to the corresponding carbonyl compounds by gaseous oxygen in the presence of the "tellurium" catalyst at temperatures between the boiling point of the alcohol and the temperature at which the alcohol decomposes.

The "tellurium" catalyst prepared as described hereinbefore is ready for use in the method of producing carbonyl compounds described herein without activation. However, when tellurium dioxide ($TeO_2$) on an inert support is to be used as a catalyst for the production of carbonyl compounds, it has been found desirable to activate the material by a series of alternate reductions with hydrogen and oxidations with an oxidizing gas such as air or oxygen the final step of the series being a treatment with an oxidizing gas. A catalyst activated in this manner was used in the conversion, at 400° C., of propylene to acrolein using a molar air to propylene ratio of 2.3 and a contact time of 17 seconds. A 4.5 per cent conversion of propylene to acrolein with a 1.2 per cent conversion to carbon dioxide was achieved.

A catalyst activated in the same manner was employed in the conversion, at 393° C., of propylene to acrolein using a molar air to propylene ratio of 3.0 and a contact time of 25 seconds. A 7.6 per cent conversion of propylene to acrolein with a 2.2 per cent conversion to carbon dioxide was obtained.

It is to be noted that lesser contact times and higher air to propylene ratios both result in considerably lower conversions per pass.

While alternate reduction and oxidation of the tellurium catalyst has been found to provide a satisfactory catalyst, activation of a relatively inert catalyst by contact with a mixture of the compound to be oxidized and oxygen at the temperature at which the oxidation of said compound is to be carried out has given the best results to date.

A characteristic of the catalyst disclosed hereinbefore is its capacity to promote the oxidation of methyl or methylene groups directly adjacent to a center of unsaturation in an organic compound such as, for example, the unsaturation found in aromatic compounds, olefins or carbonyl groups. A further distinguishing feature is the fact that although the catalyst catalyzes the oxidation of such methyl and methylene groups to carbonyl groups, $$=C=O \text{ or } -\overset{O}{\underset{\|}{C}}-H$$

it does not catalyze the oxidation of carbonyl groups to higher states of oxidation. Thus, it is specific for the following transformations:

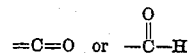

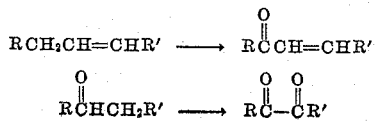

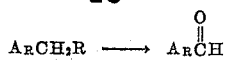

Compounds intermediate between the above reactants and the products in oxidation state such as, for example, benzyl alcohol, allyl alcohol and the like also can be oxidized using the technique disclosed hereinbefore. Ethylene can be oxidized to glyoxal and anthracene to anthraquinone as can organic substances which form in situ reactants such as those the oxidation of which has been discussed herein or their intermediate oxidation products through dehydrogenation, dehydration, rearrangement, dehalogenation, dehydrohalogenation and similar reactions, for instance, methyl cyclohexadiene, tertiary butanol, beta-pinene, 3,3-diiodopropane and alpha-bromodiethylketone.

I claim:

1. A method of treating organic compounds having an activated radical selected from the group consisting of methyl and methylene radicals to convert the activated radical to a carbonyl group which consists essentially of contacting an organic compound in the vapor state with a gas containing free oxygen and about 0.5 to about 20 mole per cent based upon said organic compound of a halogen having a molecular weight greater than 38 at a temperature of about 500° to about 1022° F. in the presence of a finely divided catalyst consisting essentially of predominantly at least one oxide of tellurium, the volume ratio of said organic compound and said gas containing free oxygen being between about 1:1 and about 1:9 and said organic compound having a radical selected from the group consisting of methyl and methylene radicals and said radical being positioned in said organic compound adjacent an activating moiety selected from the group consisting of a carbonyl group and a center of unsaturation.

2. A method of treating organic compounds having an activated radical selected from the group consisting of methyl and methylene radicals to convert the activated radical to a carbonyl group which consists essentially of contacting an organic compound in the vapor state with a gas containing free oxygen and about 0.5 to about 20 mole per cent based upon said organic compound of a halogen having a molecular weight greater than 38 at a temperature of at least about 500° F. but not greater than the temperature at which said organic compound decomposes in the presence of a finely divided catalyst consisting essentially of predominantly at least one oxide of tellurium, the volume ratio of said organic compound and said gas containing free oxygen being between about 1:1 and about 1:9 and said organic compound having a radical selected from the group consisting of methyl and methylene radicals and said radical being positioned in said organic compound adjacent an activating moiety selected from the group consisting of a carbonyl group and a center of unsaturation.

3. A method of treating organic compounds having an activated radical selected from the group consisting of methyl and methylene radicals to convert the activated radical to a carbonyl group which consists essentially of contacting an organic compound in the vapor state with a gas containing free oxygen in the ratio of 1:1 to about 1:9, said gas containing free oxygen being admixed with about 1 to about 9 mole per cent based upon said organic compound of a halogen having a molecular weight greater than 38 at a temperature of at least about 500° F. but not greater than the temperature at which said organic compound decomposes in the presence of a finely divided catalyst consisting essentially of predominantly at least one oxide of tellurium, said organic compound having a radical selected from the group consisting of methyl and methylene radicals positioned in said organic compound adjacent an activating moiety selected from the group consisting of a carbonyl group and a center of unsaturation.

4. A method of treating an organic compound having an activated radical selected from the group consisting of methyl and methylene radicals to convert the activated radical to a carbonyl group which consists essentially of heating an organic compound in the vapor state in admixture with a gas containing free oxygen and about 0.5 to about 20 mole per cent based upon said organic compound of a halogen having a molecular weight greater than 38 to a temperature of at least about 500° F. but not greater than the temperature at which said organic compound decomposes in the presence of a finely divided catalyst consisting essentially of predominantly at least one oxide of tellurium, the volume ratio of said organic compound and said gas containing free oxygen being between about 1:1 and about 1:9 and said organic compound having a radical selected from the group consisting of methyl and methylene radicals and said radical being positioned in said organic compound adjacent an activating moiety selected from the group consisting of a carbonyl group and a center of unsaturation.

5. The method as described and set forth in claim 4 wherein the organic compound is an olefin.

6. The method as described and set forth in claim 4 wherein the organic compound is an aromatic compound.

7. The method set forth in claim 4 wherein the organic compound is propylene and the temperature is above about 500° F. and not greater than about 1022° F.

8. The method set forth in claim 4 wherein the organic compound is propylene, the halogen is chlorine and the temperature is above about 500° F. but not greater than about 1022° F.

9. The method set forth in claim 4 wherein the organic compound is propylene, the halogen is bromine and the temperature is above about 500° F. but not greater than about 1022° F.

10. The method set forth in claim 4 wherein the organic compound is toluene and the temperature is about 500° F. to about 1022° F.

11. The method set forth in claim 4 wherein the organic compound is toluene and the halogen is chlorine.

12. The method set forth in claim 4 wherein the organic compound is toluene, the halogen is chlorine and the temperature is about 500° to about 1022° F.

13. The method set forth in claim 4 wherein the organic compound is toluene, the halogen is bromine and the temperature is about 500° to about 1022° F.

14. The method set forth in claim 4 wherein the organic compound is propylene, the halogen is chlorine, the gas containing free oxygen is air, the propylene, air and chlorine are in the proportion 50:150:1 to 2 parts by volume and the temperature is about 700° F.

15. The method set forth and described in claim 4 wherein the organic compound is propylene, the gas containing free oxygen is air, the halogen is bromine, the propylene, air and bromine are in the proportion of 50:150:0.54 parts by volume, and the temperature is about 700° F.

16. The method set forth and described in claim 4 wherein the organic compound is toluene, the gas containing free oxygen is air, the halogen is chlorine, the toluene, air and chlorine are in the proportion of 44:300:1 to 2 parts by volume and the temperature is about 750° to about 770° F.

FREDERICK B. AUGUSTINE.

References Cited in the file of this patent

UNITED STATES PATENTS

| Number | Name | Date |
|---|---|---|
| 2,339,348 | McNamee et al. | Jan. 18, 1944 |
| 2,383,711 | Clark et al. | Aug. 28, 1945 |
| 2,428,590 | Shokal et al. | Oct. 7, 1947 |
| 2,435,763 | Vaughan et al. | Feb. 10, 1948 |
| 2,444,924 | Farkas et al. | July 13, 1948 |
| 2,486,842 | Hearne et al. | Nov. 1, 1949 |
| 2,530,923 | Turk et al. | Nov. 21, 1950 |

FOREIGN PATENTS

| Number | Country | Date |
|---|---|---|
| 577,992 | Great Britain | June 11, 1946 |
| 625,330 | Great Britain | June 27, 1949 |